United States Patent
Chaussade et al.

(10) Patent No.: US 7,838,613 B2
(45) Date of Patent: Nov. 23, 2010

(54) POLYORGANOSILOXANE MONOCOMPONENT COMPOUND CROSSLINKING INTO SILICONE ELASTOMER

(75) Inventors: Marc Chaussade, Villeurbanne (FR); Nathalie Guennouni, Irigny (FR)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 881 days.

(21) Appl. No.: 10/584,396

(22) PCT Filed: Dec. 21, 2004

(86) PCT No.: PCT/FR2004/003327

§ 371 (c)(1),
(2), (4) Date: Mar. 28, 2007

(87) PCT Pub. No.: WO2005/071007

PCT Pub. Date: Aug. 4, 2005

(65) Prior Publication Data

US 2007/0282088 A1      Dec. 6, 2007

(30) Foreign Application Priority Data

Dec. 23, 2003   (FR) .................... 03 15286

(51) Int. Cl.
*C08G 77/00*   (2006.01)
*C08G 77/04*   (2006.01)
*C08G 77/06*   (2006.01)

(52) U.S. Cl. .......................................... 528/18; 528/19

(58) Field of Classification Search ............... 528/18
See application file for complete search history.

(56) References Cited

U.S. PATENT DOCUMENTS

| | | | | | |
|---|---|---|---|---|---|
| 3,664,997 | A | * | 5/1972 | Chadha et al. | 528/18 |
| 3,792,008 | A | | 2/1974 | Neuroth | |
| 4,562,238 | A | * | 12/1985 | Kondo et al. | 528/18 |
| 4,749,766 | A | * | 6/1988 | Millet | 528/18 |
| 4,795,786 | A | | 1/1989 | Umpleby | |
| 4,918,140 | A | | 4/1990 | Peccoux et al. | |
| 5,519,104 | A | | 5/1996 | Lucas | |
| 5,561,184 | A | * | 10/1996 | Miyoshi et al. | 524/425 |
| 6,383,648 | B1 | * | 5/2002 | Tamai et al. | 428/447 |

FOREIGN PATENT DOCUMENTS

| | | |
|---|---|---|
| CN | 85 106766 A | 3/1987 |
| CN | 1365379 A | 8/2002 |
| EP | 0 565 318 A1 | 10/1993 |
| EP | 1 108 752 A1 | 6/2001 |
| EP | 1 323 782 A2 | 7/2003 |
| WO | WO 00/75234 A1 | 12/2000 |

* cited by examiner

*Primary Examiner*—Randy Gulakowski
*Assistant Examiner*—Robert Loewe
(74) *Attorney, Agent, or Firm*—Buchanan, Ingersoll & Rooney, P.C.

(57) ABSTRACT

The invention relates to polyorganosiloxane monocomponent compounds (POS) which are stable when stored without humidity and crosslinking into elastomer in the presence of water. The inventive compounds comprise at least one type of crosslinkable linear polyorganosiloxane (POS), a mineral filler and a crosslinking catalyst of formula (I) which provides said compound with an excellent compromise between cross linking kinetics and a storage stability (i.e. more than 6 months).

20 Claims, No Drawings

POLYORGANOSILOXANE MONOCOMPONENT COMPOUND CROSSLINKING INTO SILICONE ELASTOMER

CROSS-REFERENCE TO RELATED APPLICATIONS

This application is the U. S. national stage of International Application No. PCT/FR2004/003327, filed Dec. 21, 2004 and claims priority under 35 U.S.C. §119 of Application No. 0315286, filed in France on Dec. 23, 2003, incorporated by reference herein in their entireties and relied upon.

The field of the invention is that of single-component silicone mastics which are stable on storage in the absence of moisture and which crosslink by polycondensation at ambient temperature (for example, 5 to 35° C.) in the presence of water (for example, ambient moisture) to result in elastomers which adhere to various supports.

The formulations of the elastomers which crosslink by polycondensation generally involve a silicone oil, generally polydimethylsiloxane (PDMS), comprising hydroxylated endings, optionally prefunctionalized by a silane so as to exhibit —Si(OR)$_a$ endings, a crosslinking agent R$_b$Si(OR')$_{4-b}$, where b<3, a polycondensation catalyst, conventionally a tin salt or an alkyl titanate, a reinforcing filler and other optional additives, such as bulking fillers, adhesion promoters, colourants, biocidal agents, and the like. During the crosslinking, atmospheric moisture makes possible the polycondensation reaction, which results in the formation of the elastomeric network.

These elastomers can be used in a wide range of applications, such as adhesive bonding, rendering leaktight and moulding. They are used in particular in the building industry, as means for rendering leaktight, for pointing and/or for assembling.

These single-component silicone elastomers comprising —Si(OR)$_a$ ends are sometimes denoted under the name "alkoxy elastomers". The main problem encountered with these elastomers is the stability of the product during storage; the tin catalyst is responsible for premature ageing of the compositions. Many studies have been carried out in this field in attempting to increase the stability or to confer specific properties on the catalyst: EP-A-1 108 752, EP-A-0 885 933, WO-A-03/018691, WO-A-03/035761, U.S. Pat. Nos. 4,554, 338, 5,519,104 and 4,749,766.

Conventional polycondensation catalysts comprise dialkyltin compounds, in particular dialkyltin dicarboxylates, such as dibutyltin dilaurate and diacetate, alkyl titanate compounds, such as tetrabutyl or tetraisopropyl titanate, or titanium chelates (EP-A-0 885 933, U.S. Pat. Nos. 5,519,104, 4,515,932, 4,563,498 and 4,528,353).

More complex solutions have been provided, with mixtures of catalysts, as in U.S. Pat. No. 4,749,766, which discloses mixtures of a diorganotin bis(beta-diketonate) and of an organotin(IV) compound devoid of beta-diketonate functionality which can be selected from numerous monotin, ditin and distannoxane chemical structures. Examples with the conventional compound di(n-butyl)tin dilaurate, alone or in combination with a tin chelate, are described. During ageing at 70° C. for 329 hours, the compositions comprising only di(n-butyl)tin dilaurate exhibit a true lack of stability. On the other hand, the compositions comprising the two catalytic entities exhibit better stability under the same accelerated ageing conditions.

U.S. Pat. No. 5,519,104 also discloses combinations of two tin catalysts of the category of the R$_2$Sn(dicarboxylates) and in particular the simultaneous use of dibutyltin diacetate and dibutyltin dilaurate.

Another course of research was the development of novel tin compounds. EP-A-1 108 752 and WO-A-03/018691 disclose tin compounds of the R$_2$Sn(OR')$_2$ or R$_2$SnOSn(OR')$_2$ type.

The tests carried out by the Applicant starting from the conventional catalyst dibutyltin dilaurate and catalysts provided in EP-A-1 108 752 thus result in compositions which are not stable on storage and thus do not make it possible to guarantee crosslinking after storage for several months. In particular, absence of crosslinking has been found after storage for 6 months.

The object of the invention was consequently to find tin catalysts which make it possible to obtain an excellent compromise between crosslinking kinetics and stability on storage.

An important object was to provide catalysts capable of introducing these properties by themselves alone and thus to be able to avoid recourse to mixtures of catalysts, which increase the complexity of the process and the production costs.

A specific object of the invention is to provide catalysts which make it possible to produce compositions having a stability exceeding 6 months.

These objects, and others, are achieved by the use, in an alkoxy single-component silicone elastomer composition, of a tin catalyst C of formula (C):

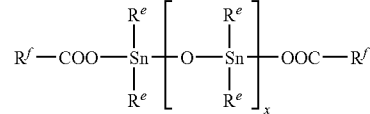

in which formula:
  R$^e$, which are identical or different, represent a linear or branched C$_1$-C$_8$, preferably C$_4$, alkyl radical,
  x is 0 or 1,
  when x is 1, R$^f$, which are identical or different, represent a saturated or unsaturated and linear or branched C$_1$-C$_{25}$, preferably C$_1$-C$_{15}$, alkyl radical optionally comprising one or more oxygen atoms and optionally comprising one or more ester or ether functional groups; formula C1 can be written:

  [R$^e{}_2$Sn(OOC—R$^f$)]$_2$O, when x is 0, R$^f$, which are identical or different, represent a saturated or unsaturated and linear or branched C$_1$-C$_{25}$, preferably C$_1$-C$_{15}$, heteroalkyl radical comprising one or more O and optionally comprising one or more ester or ether functional groups; formula C2 can be written:

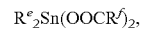
  R$^e{}_2$Sn(OOCR$^f$)$_2$, the catalyst being present in an amount corresponding to from 0.05 to 0.35 mmol of tin per 100 g of composition, preferably from 0.15 to 0.32.

The following catalysts each constitute preferred embodiments (Bu=butyl):
  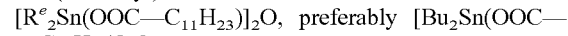
  [R$^e{}_2$Sn(OOC—C$_{11}$H$_{23}$)]$_2$O, preferably [Bu$_2$Sn(OOC—C$_{11}$H$_{23}$)]$_2$O
  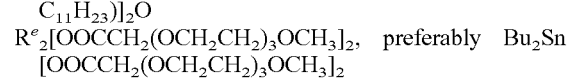
  R$^e{}_2$[OOCCH$_2$(OCH$_2$CH$_2$)$_3$OCH$_3$]$_2$, preferably Bu$_2$Sn[OOCCH$_2$(OCH$_2$CH$_2$)$_3$OCH$_3$]$_2$ $R^e{}_2Sn(OOCCH=CHCOOR)_2$, preferably $Bu_2Sn(OOCCH=CHCOOR)_2$, R being an optionally branched $C_2$-$C_8$ alkyl radical; the catalyst can be a mixture of such molecules comprising R radicals having different C numbers of between 2 and 8.

The use of one of these catalysts in the proportions defined above makes it possible to obtain, by itself alone, an excellent compromise between crosslinking kinetics and stability on storage with, for example, the production of compositions having a stability exceeding 6 months, that is to say that these compositions, after long-term storage, are still capable of appropriately crosslinking. Of course, the use in the same composition of a mixture of at least two of them remains within the scope of the invention.

The preparation of the tin organic compounds is known. Mention may be made of the following references: Main Group Metal Chemistry, 25(10), 635-642, 2002; Journal of Organometallic Chemistry, 430(2), 167-73, 1992; Journal of Organometallic Chemistry, 412(1-2), 39-45, 1991; Journal of Organometallic Chemistry, 372(2), 193-9, 1989; Tetrahedron, 45(4), 1219-29, 1989; Journal of Organometallic Chemistry, 311(3), 281-8, 1986; Synthesis and Reactivity in Inorganic and Metal-Organic Chemistry, 32(8), 1373-1392, 2002; Chinese Journal of Chemistry, 19(11), 1141-1145, 2001; Synthesis and Reactivity in Inorganic and Metal-Organic Chemistry, 30(9), 1715-1729, 2000; Zeitschrift für Kristallographie, 214(11), 758-762, 1999; Applied Organometallic Chemistry, 7(1), 39-43, 1993; Journal of Organometallic Chemistry, 430(2), 139-48, 1992, GB-A-1 009 368.

A subject-matter of the invention is thus a single-component polyorganosiloxane (POS) composition which is stable on storage in the absence of moisture and which crosslinks, in the presence of water, to give an elastomer, which composition comprises at least one crosslinkable linear polyorganopolysiloxane POS, an inorganic filler and a crosslinking catalyst as described above in an amount corresponding to from 0.05 to 0.35 mmol of tin per 100 g of composition, preferably from 0.15 to 0.32.

In a preferred embodiment, the said composition is characterized in that it comprises:

-A- at least one crosslinkable linear polyorganopolysiloxane A of formula (A):

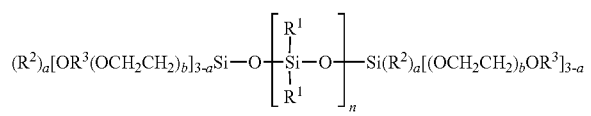

in which:
the substituents $R^1$, which are identical or different, each represent a saturated or unsaturated, substituted or unsubstituted, aliphatic, cyclanic or aromatic, $C_1$ to $C_{13}$ monovalent hydrocarbon radical;
the substituents $R^2$, which are identical or different, each represent a saturated or unsaturated, substituted or unsubstituted, aliphatic, cyclanic or aromatic, $C_1$ to $C_{13}$ monovalent hydrocarbon radical;
the substituents $R^3$, which are identical or different, each represent a linear or branched $C_1$ to $C_8$ alkyl radical or a $C_3$ to $C_8$ cycloalkyl;
n has a value sufficient to confer, on the POS A, a dynamic viscosity at 25° C. ranging from 500 to 1 000 000 mPa·s;
a is zero or 1;
b is zero or 1;

—B—optionally at least one polyorganosiloxane resin B functionalized by at least one alkoxy radical $(OCH_2CH_2)_bOR^3$, with b and $R^3$ corresponding to the definition given above, and exhibiting, in its structure, at least two different siloxyl units chosen from those of formulae $(R^1)_3SiO_{1/2}$(unit M), $(R^1)_2SiO_{2/2}$(unit D), $R^1SiO_{3/2}$(unit T) and $SiO_2$ (unit Q), at least one of these units being a T or Q unit, the radicals $R^1$, which are identical or different, having the meanings given above with respect to the formula (A), the said resin having a content by weight of $(OCH_2CH_2)_bOR^3$ radicals ranging from 0.1 to 10%, it being understood that a portion of the radicals $R^1$ are $(OCH_2CH_2)_bOR^3$ radicals -D- optionally at least one crosslinking agent D of formula:

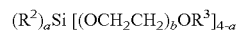

with $R^2$, $R^3$, a and b as defined above,

-E- optionally at least one unreactive and nonfunctionalized linear polydiorganosiloxane E of formula:

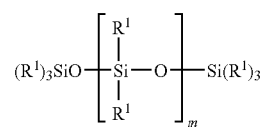

in which
the substituents $R^1$, which are identical or different, have the same meanings as those given above for the polyorganosiloxane A;
m has a value sufficient to confer, on the polymer E, a dynamic viscosity at 25° C. ranging from 10 to 200 000 mPa·s;
—F—an inorganic filler F, in particular a reinforcing and/or bulking filler, preferably based on silica;
H—optionally at least one auxiliary agent H.

The composition according to the invention corresponds to an embodiment in which the essential constituent, namely the POS A, is functionalized at its ends by alkoxy radicals. These functionalized POS A correspond to a form stable in the absence of moisture of the single-component mastic considered here. In practice, this stable form is that of the composition packaged in hermetically sealed cartridges which will be opened by the operator during use and which allow him to apply the mastic over all the substrates desired.

The state of the art offers various routes to producing these compounds. By way of example, the POS A can carry hydroxyl functional groups (hydroxylated precursor A') and these functional groups can be reacted with a crosslinking silane D according to a condensation process. The hydroxylated precursor A' of the alkoxy-functionalized POS A can be an α,ω-hydroxylated polydiorganosiloxane of formula:

with $R^1$ and n as defined above in the formula (A).

The optional alkoxy-functionalized resin POS B can be produced in the same way as the alkoxy-functionalized POS A by condensation with a crosslinking silicone D carrying alkoxy functionalization radicals.

The precursor of the alkoxy resin POS B can be a hydroxylated resin POS B' corresponding to the definition given above for B, except that a portion of these radicals $R^1$ correspond to OH groups.

Mention will be made, among the auxiliaries H or additives particularly advantageous for the composition according to the invention, of adhesion promoters and additives promoting stability of the compositions.

Thus, the single-component mastic POS composition according to the invention preferably comprises at least one aminated or nonaminated adhesion promoter H1, preferably an organosilicon compound, preferably a silane, simultaneously carrying:

(1) one or more hydrolysable groups bonded to the silicon atom and
(2) one or more organic groups comprising radicals chosen from the group of the aminated (or diaminated), (meth)acrylate, epoxy, alkenyl (typically with 2 to 6 C) and/or alkyl (typically with 1 to 8 C) radicals.

Use may be made, by way of examples, of one of the following silanes or of a mixture of at least two of them:
3-aminopropyltriethoxysilane,
(beta-aminoethyl)(gamma-aminopropyl)trimethoxysilane,
(beta-aminoethyl)(gamma-aminopropyl)methyldimethoxysilane,
3-aminopropyltrimethoxysilane,
vinyltrimethoxysilane,
3-glycidyloxypropyltrimethoxysilane,
3-methacryloxypropyltrimethoxysilane,
propyltrimethoxysilane,
methyltrimethoxysilane,
ethyltrimethoxysilane,
vinyltriethoxysilane,
3-aminopropylmethyldimethoxysilane,
3-aminopropylmethyldiethoxysilane,
methyltriethoxysilane,
propyltriethoxysilane,
tetraethoxysilane,
tetrapropoxysilane,
tetraisopropoxysilane, or polyorganosiloxane oligomers comprising such organic groups at a content of greater than 20%.

As an adhesion promoter, use may also be made of a silicate bearing one or several hydrolysable groups, notably alkyl groups, typically having from 1 to 8 C. Mention may be made of propyl silicates, isopropyl silicates and ethyl silicates. The silicates may be polycondensed or not.

It can also comprise a stability additive H2 (in or not in addition to H1), the purpose of which will be to react with the residual water present in the cartridge or which has penetrated therein due to lack of leaktightness of the latter. Hexamethyldisilazane, vinyltrimethoxysilane and their mixture will preferably be selected.

In order to explain in somewhat greater detail the nature of the constituent components of the composition according to the invention, it is important to specify that the substituents $R^1$ of the polymers POS A, of the resins B and of the optional polymers E can be selected from the group formed by:
  alkyl and haloalkyl radicals having from 1 to 13 carbon atoms,
  cycloalkyl and halocycloalkyl radicals having from 5 to 13 carbon atoms,
  alkenyl radicals having from 2 to 8 carbon atoms,
  mononuclear aryl and haloaryl radicals having from 6 to 13 carbon atoms,
  cyanoalkyl radicals, the alkyl members of which have from 2 to 3 carbon atoms, the methyl, ethyl, propyl, isopropyl, n-hexyl, phenyl, vinyl and 3,3,3-trifluoropropyl radicals being particularly preferred.

More specifically still, and without implied limitation, the substituents $R^1$ mentioned above for the polymers POS A and E (optional) comprise:
  alkyl and haloalkyl radicals having from 1 to 13 carbon atoms, such as the methyl, ethyl, propyl, isopropyl, butyl, pentyl, hexyl, 2-ethylhexyl, octyl, decyl, 3,3,3-trifluoropropyl, 4,4,4-trifluorobutyl or 4,4,4,3,3-pentafluorobutyl radicals,
  cycloalkyl and halocycloalkyl radicals having from 5 to 13 carbon atoms, such as the cyclopentyl, cyclohexyl, methylcyclohexyl, propylcyclohexyl, 2,3-difluorocyclobutyl or 3,4-difluoro-5-methylcycloheptyl radicals,
  alkenyl radicals having from 2 to 8 carbon atoms, such as the vinyl, allyl or buten-2-yl radicals,
  mononuclear aryl and haloaryl radicals having from 6 to 13 carbon atoms, such as the phenyl, tolyl, xylyl, chlorophenyl, dichlorophenyl or trichlorophenyl radicals,
  cyanoalkyl radicals, the alkyl members of which have from 2 to 3 carbon atoms, such as the β-cyanoethyl and γ-cyanopropyl radicals.

Mention may be made, as concrete examples of siloxyl units D, $(R^1)_2SiO_{2/2}$, present in the diorganopolysiloxanes A and in the optional unreactive diorganopolysiloxanes E, of:

$(CH_3)_2SiO$, $CH_3(CH_2\!\!=\!\!CH)SiO$, $CH_3(C_6H_5)SiO$, $(C_6H_5)_2SiO$, $CF_3CH_2CH_2(CH_3)SiO$, $NC\!\!-\!\!CH_2CH_2(CH_3)SiO$, $NC\!\!-\!\!CH(CH_3)CH_2(CH_2\!\!=\!\!CH)SiO$, $NC\!\!-\!\!CH_2CH_2CH_2(C_6H_5)SiO$.

It should be understood that, in the context of the present invention, use may be made, as functionalized polymers A, of a mixture composed of several polymers which differ from one another in the value of the viscosity and/or the nature of the substituents bonded to the silicon atoms. Furthermore, it should be pointed out that the functionalized polymers A can optionally comprise siloxyl units T of formula $R^1SiO_{3/2}$ and/or siloxyl units Q of formula $SiO_{4/2}$ in the proportion of at most 1% (this % expressing the number of T and/or Q units per 100 silicon atoms). The same comments apply to the polymers E.

The substituents $R^1$ of the functionalized polymers A and of the polymers E (optional) advantageously used, due to their availability in industrial products, are the methyl, ethyl, propyl, isopropyl, n-hexyl, phenyl, vinyl and 3,3,3-trifluoropropyl radicals. More advantageously, at least 80% by number of these substituents are methyl radicals.

Use is made of functionalized polymers A having a dynamic viscosity at 25° C. ranging from 500 to 1 000 000 mPa·s and preferably ranging from 2000 to 200 000 mPa·s.

As regards the polymers E (optional), they exhibit a dynamic viscosity at 25° C. ranging from 10 to 200 000 mPa·s and preferably ranging from 50 to 150 000 mPa·s.

The polymers E, when they are used, can be introduced all at once or in several fractions and at several stages or at a single stage of the preparation of the composition.

The possible fractions can be identical or different in terms of nature and/or of proportions. Preferably, E is introduced all at once at a single stage.

Mention may be made, as examples of substituents R' of the resins POS B which are suitable or which are advantageously used, of the various radicals $R^1$ of the type of those mentioned by name above for the functionalized polymers A. These silicone resins are well known branched polyorganosiloxane polymers, the processes for the preparation of which are described in numerous patents. Mention may be made, as concrete examples of resins which can be used, of the MQ, MDQ, TD and MDT resins.

Preferably, mention may be made, as examples of resins which can be used, of the resins POS B not comprising, in their structure, the Q unit. More preferably, mention may be made, as examples of resins which can be used, of the functionalized TD and MDT resins comprising at least 20% by weight of T units and having a content by weight of alkoxy group ranging from 0.3 to 5%. More preferably still, use is made of resins of this type in the structure of which at least 80% by number of the substituents $R^1$ are methyl radicals. The alkoxy groups of the resins B can be carried by the M, D and/or T units.

As regards the functionalized POSs A and the crosslinking agents D, mention may be made, as concrete examples of substituents $R^2$ which are particularly suitable, of the same radicals as those mentioned by name above for the substituents $R^1$ of the polymers A.

As regards the constituent substituents $R^3$, $R^4$ and $R^5$ of the alkoxy radicals, it will be mentioned that $C_1$-$C_4$ alkyl radicals, such as the methyl, ethyl, propyl, isopropyl and n-butyl radicals, prove to be more especially appropriate.

According to a preferred embodiment of the composition according to the invention, the alkoxy radicals used for the functionalization of the initially hydroxylated POS result from silane crosslinking agents D chosen from the group consisting of $Si(OCH_3)_4$ $Si(OCH_2CH_3)_4$ $Si(OCH_2CH_2CH_3)_4$ $(CH_3O)_3SiCH_3$ $(C_2H_5O)_3SiCH_3$ $(CH_3O)_3Si(CH=CH_2)$ $(C_2H_5O)_3Si(CH=CH_2)$ $(CH_3O)_3Si(CH_2—CH=CH_2)$ $(CH_3O)_3Si[CH_2—(CH_3)C=CH_2]$ $(C_2H_5O)_3Si(OCH_3)$ $Si(OCH_2—CH_2—OCH_3)_4$ $CH_3Si(OCH_2—CH_2—OCH_3)_3$ $(CH_2=CH)Si(OCH_2CH_2OCH_3)_3$ $C_6H_5Si(OCH_3)_3$ $C_6H_5Si(OCH_2—CH_2—OCH_3)_3$.

According to one embodiment of the invention, the composition comprising the POS A and the catalyst can also comprise at least one crosslinking agent D as described above.

The inorganic filler F can be composed of amorphous silica in the form of a solid. The physical state under which the silica is provided is not important, that is to say that said filler can be provided in the form of a powder, of micropearls, of granules or of beads.

All precipitated silicas or pyrogenic silicas (or fumed silicas) known to a person skilled in the art are suitable as amorphous silica capable of being employed in the invention. Of course, use may also be made of blends of various silicas.

Preference is given to precipitated silicas in the powder form, fumed silicas in the powder form or their mixtures; their BET specific surface is generally greater than 40 $m^2/g$ and preferably between 100 and 300 $m^2/g$; more preferably, use is made of fumed silicas in the powder form.

According to one alternative form, the filler F can be composed, in addition to or instead of silica, of opacifying white fillers, such as calcium carbonates, titanium oxides or aluminium oxides, indeed even of carbon blacks.

In practice, the fillers F can be provided in the form of more coarsely divided inorganic and/or organic products, with a mean particle diameter of greater than 0.1 micron; the preferred fillers include ground quartz, diatomaceous silicas, calcium carbonate, calcined clay, titanium oxide of the rutile type, iron, zinc, chromium, zirconium or magnesium oxides, the various forms of alumina (hydrated or nonhydrated), boron nitride, lithopone, barium metaborate, cork powder, wood sawdust, phthalocyanines, inorganic and organic fibres, and organic polymers (polytetrafluoroethylene, polyethylene, polypropylene, polystyrene or poly(vinyl chloride)).

These fillers can be modified at the surface, and more especially fillers of inorganic origin, by treatment with the various organosilicon or organic compounds commonly employed for this use. Thus, these organosilicon compounds can be organochlorosilanes, diorganocyclopolysiloxanes, hexaorganodisiloxanes, hexaorganodisilazanes or diorganocyclopolysilazanes (Patents FR 1 126 884, FR 1 136 885, FR 1 236 505 and GB 1 024 234). The treated fillers include, in the majority of cases, from 3 to 30% of their weight of organosilicon compounds.

The purpose of the introduction of the fillers is to confer good mechanical and rheological characteristics on the elastomers resulting from the curing of the compositions in accordance with the invention. A single type of filler or mixtures of several types can be introduced.

Use may be made, in combination with these fillers, of inorganic and/or organic pigments and of agents which improve the temperature stability (rare earth metal salts and oxides, such as ceric oxides and hydroxides) and/or the flame resistance of the elastomers. Mention may be made, among the agents for improving the flame resistance, of halogenated organic derivatives, organic phosphorus derivatives, platinum derivatives, such as chloroplatinic acid (its reaction products with alkanols or ethers), or platinous chloride-olefin complexes. These pigments and agents together represent at most 20% of the weight of the fillers.

According to a preferred characteristic of the invention, the single-component mastic POS composition comprises:

100 parts by weight of linear diorganopolysiloxane(s) A, from 0 to 30, preferably from 5 to 15, parts by weight of hydroxylated resin(s) B, from 2 to 15, preferably from 3.5 to 12, parts by weight of crosslinking agent(s) D, from 0 to 60, preferably from 5 to 60, parts by weight of linear diorganopolysiloxane(s) E, from 2 to 250, preferably from 10 to 200, parts by weight of filler based on silica and/or on carbonate F, and from 0 to 20, in particular from 0.1 to 20, preferably from 0.1 to 10, parts by weight of adhesion promoter H, with at least one catalyst according to the invention, present in an amount corresponding to from 0.05 to 0.35 mmol of tin per 100 g of composition, preferably from 0.15 to 0.32.

Other conventional auxiliary agents and additives H can be incorporated in the composition according to the invention; these are chosen according to the applications in which said compositions are used.

The compositions in accordance with the invention cure at ambient temperature and in particular at temperatures of between 5 and 35° C. in the presence of moisture.

These compositions can be employed for multiple applications, such as pointing in the building industry, the assembling and adhesive bonding of the most diverse materials (metals; plastics, such as, for example, PVC, PMMA or polycarbonate; natural and synthetic rubbers; wood; board; earthenware; brick; glass; stone; concrete; masonry components), both in the context of the building industry and in that of the motor vehicle, domestic electrical appliance and electronics industries.

According to another of its aspects, another subject-matter of the present invention is an elastomer, in particular an elastomer capable of adhering to various substrates, obtained by crosslinking and curing the single-component silicone mastic composition described above. According to the preferred embodiment, this composition contains at least one adhesion promoter H1 as defined above.

The single-component organopolysiloxane compositions in accordance with the present invention are prepared with the exclusion of moisture by carrying out the preparation in a closed reactor equipped with a stirrer in which it is possible, if required, to apply a vacuum and then optionally to replace the air expelled with an anhydrous gas, for example with nitrogen.

Mention may be made, as examples of equipment, of: slow dispersers, paddle, propeller, arm or anchor mixers, planetary mixers, hook mixers, or single-screw or multiple-screw extruders.

The invention also relates to the use of one or more catalysts C for the catalysis of the silicone compositions which crosslink by polycondensation at ambient temperature (for example, between 5 and 35° C.) in the presence of water (for example, ambient moisture), for example to that of these compositions which are intended to produce elastomers which adhere to various supports. In the preferred embodiment, this or these catalysts are used alone for the catalysis of the silicone compositions which are specifically described above, namely alkoxy single-component silicone elastomers.

The use of these catalysts makes it possible to obtain an excellent compromise between crosslinking kinetics and stability of storage, for example with the production of compositions having a stability exceeding 6 months, that is to say that these compositions, after long-term storage, are still capable of appropriately crosslinking. The examples which will follow show that these objects are achieved and that, for example, after storate for 6 months, the compositions in accordance with the invention are capable of crosslinking at a suitable rate and of resulting in an elastomer of acceptable hardness.

The invention will be better understood with the help of the non-limiting examples which follow.

EXAMPLES

I—Comparative Example 1

724 g of $\alpha,\omega$-difunctional $(SiVi(OMe)_2)$polydimethylsiloxane oil A with a viscosity of approximately 135 000 mPa·s, 300 g of $\alpha,\omega$-trimethylsilylated polydimethylsiloxane oil with a viscosity of approximately 100 mPa·s and 36 g of vinyltrimethoxysilane crosslinking agent are charged to the vessel of a "butterfly" uniaxial mixer. The combined product is mixed at 200 rev/min for 2 min and then 114 g of Aerosil 150 silica from Degussa are incorporated at a moderate stirring rate (160 rev/min) and then a more vigorous stirring rate (4 min at 400 rev/min) in order to bring to completion the dispersion thereof in the mixture. 2.88 g of dibutyltin dilaurate (0.38 mmol of tin/100 g of product) and 18 g of 3-aminopropyltriethoxysilane are then added. After mixing at 400 rev/min for 4 min, the stirring rate is reduced to 130 rev/min and the mixture is degasssed under vacuum at 50 mbar. The preparation is then transferred into a container for storage.

II—Comparative Example 2

800 g of $\alpha,\omega$-difunctional $(SiVi(OMe)_2)$polydimethylsiloxane oil A with a viscosity of approximately 135 000 mPa·s, 240 g of $\alpha,\omega$-trimethylsilylated polydimethylsiloxane oil with a viscosity of approximately 100 mPa·s and 36 g of vinyltrimethoxysilane crosslinking agent are charged to the vessel of a "butterfly" uniaxial mixer. The combined product is mixed at 200 rev/min for 2 min and then 114 g of Aerosil 150 silica from Degussa are incorporated at a moderate stirring rate (160 rev/min) and then a more vigorous stirring rate (4 min at 400 rev/min) in order to bring to completion the dispersion thereof in the mixture. 2.6 g of catalyst A (0.38 mmol of tin/100 g of product) are then added. After mixing at 400 rev/min for 4 min, the stirring rate is reduced to 130 rev/min and the mixture is degasssed under vacuum at 50 mbar. The preparation is then transferred into a container for storage.

Catalyst A: $Bu_2Sn[(OCH_2CH_2)_2OCH_3]_2$—disclosed in EP-A-1 108 752.

III—Comparative Example 3

The same protocol is followed as in Example 2, apart from the difference in the nature and the amounts of catalyst: 2.12 g of catalyst B (0.38 mmol of tin/100 g of product) are added.

Catalyst B: $Bu_2Sn[(OCH_2CH_2)N(CH_2CH_3)_2]_2$—disclosed in EP-A-1 108 752.

IV—Comparative Example 4

The same protocol is followed as in Example 2, apart from the difference in the nature and the amount of catalyst: 2.64 g of catalyst C (0.38 mmol or tin/100 g of product) are added.

Catalyst C: $\{Bu_2[CH_3O(CH_2CH_2O)_7]Sn\}_2O$—disclosed in EP-A-1 108 752.

V—Results for Examples 1 to 4

In the table below, the hardness is measured on a test specimen with a thickness of 6 mm after crosslinking for 1 week at 23° C./50% RH (relative humidity).

| Test | Level of tin (mmol/100 g) | Initial hardness, Shore A | Loss in hardness after storage for 6 months (%) | Stability |
|---|---|---|---|---|
| Example 1 | 0.38 | 15 | 100 | No |
| Example 2 | 0.38 | 15 | 100 | No |
| Example 3 | 0.38 | 15 | 100 | No |
| Example 4 | 0.38 | 15 | 100 | No |

The catalysts tested do not result in compositions which are stable on storage.

VI—Comparative Example 5

724 g of α,ω-difunctional (SiVi(OMe)$_2$)polydimethylsiloxane oil A with a viscosity of approximately 135 000 mPa·s, 300 g of α,ω-trimethylsilylated polydimethylsiloxane oil with a viscosity of approximately 100 mPa·s and 36 g of vinyltrimethoxysilane crosslinking agent are charged to the vessel of a "butterfly" uniaxial mixer. The combined product is mixed at 200 rev/min for 2 min and then 114 g of Aerosil 150 silica from Degussa are incorporated at a moderate stirring rate (160 rev/min) and then a more vigorous stirring rate (4 min at 400 rev/min) in order to bring to completion the dispersion thereof in the mixture. 1.92 g of dibutyltin dilaurate (0.26 mmol of tin/100 g of product) and 18 g of 3-aminopropyltriethoxysilane are then added. After mixing at 400 rev/min for 4 min, the stirring rate is reduced to 130 rev/min and the mixture is degasssed under vacuum at 50 mbar. The preparation is then transferred into a container for storage.

VII—Example 6

The test of Example 5 is repeated, 1.92 g of dibutyltin dilaurate being replaced by 1.49 g (i.e., 0.26 mmol of tin per 100 g of mastic) of the catalyst [(C$_4$H$_9$)$_2$ Sn(OOC—C$_{11}$H$_{23}$)]$_2$O (sold by Goldschmidt under the reference Tegokat 225).

VIII—Example 7

The test of Example 5 is repeated, 1.92 g of dibutyltin dilaurate being replaced by 1.73 g (i.e., 0.26 mmol of tin per 100 g of mastic) of the catalyst Bu$_2$Sn[OOCCH$_2$(OCH$_2$CH$_2$)$_3$OCH$_3$]$_2$

IX—Comparative Example 8

The test of Example 5 is repeated, 1.92 g of dibutyltin dilaurate being replaced by 1.1 g (i.e., 0.26 mmol of tin per 100 g of mastic) of dibutyltin diacetate.

X—Example 9

The test of Example 5 is repeated, 1.92 g of dibutyltin dilaurate being replaced by 1.92 g (i.e., 0.26 mmol of tin per 100 g of mastic) of dibutyltin maleinate ester (Metatin 725, Acima, or GB-A-1 009 368).

XI—Comparative Example 10

The test of Example 5 is repeated, 1.92 g of dibutyltin dilaurate being replaced by 1.73 g (i.e., 0.26 mmol of tin per 100 g of mastic) of dibutyltin neodecanoate.

XII—Example 11

The test of Example 1 is repeated, 2.88 g of dibutyltin dilaurate being replaced by 2.23 g (i.e., 0.38 mmol of tin per 100 g of mastic) of the catalyst of Example 6.

XIII—Example 12

The test of Example 5 is repeated, 1.92 g of dibutyltin dilaurate being replaced by 2.59 g (i.e., 0.38 mmol of tin per 100 g of mastic) of the catalyst of Example 7.

XIV—Results for Examples 5 to 12

1) The results for hardness measured on a test specimen with a thickness of 6 mm after crosslinking for 1 week at 23° C., 50% RH, are given in the table below.

| Test | Level of tin (mmol/100 g) | Initial hardness, Shore A | Loss in hardness after storage for 6 months (%) | Stability |
|---|---|---|---|---|
| Example 5 | 0.26 | 16 | 100 | No |
| Example 6 | 0.26 | 16 | 19 | Yes |
| Example 7 | 0.26 | 17 | 24 | Yes |
| Example 8 | 0.26 | 18 | 83 | Very low |
| Example 9 | 0.26 | 13 | 8 | Yes |
| Example 10 | 0.26 | 17 | 53 | Low |
| Example 1 | 0.38 | 15 | 100 | No |
| Example 11 | 0.38 | 20 | 100 | No |
| Example 12 | 0.38 | 20 | 61 | Low |

2) Setting Kinetics:

| Test | Level of tin (mmol/100 g) | Ratio of hardness at 24 h to hardness at 7 days Initial state | Rate satisfactory initially | Ratio of hardness at 24 h to hardness at 7 days After 6 months at AT | Rate satisfactory after 6 months |
|---|---|---|---|---|---|
| Example 5 | 0.26 | 69 | Yes | / | Unstable |
| Example 6 | 0.26 | 94 | Yes | 54 | Yes |
| Example 7 | 0.26 | 94 | Yes | 62 | Yes |

-continued

| Test | Level of tin (mmol/100 g) | Ratio of hardness at 24 h to hardness at 7 days Initial state | Rate satisfactory initially | Ratio of hardness at 24 h to hardness at 7 days After 6 months at AT | Rate satisfactory after 6 months |
|---|---|---|---|---|---|
| Example 8 | 0.26 | 83 | Yes | 0 | No |
| Example 9 | 0.26 | 65 | Yes | 47 | Yes |
| Example 10 | 0.26 | 65 | Yes | 0 | No |
| Example 1 | 0.38 | 0 | No | / | Unstable |
| Example 11 | 0.38 | 80 | Yes | / | Unstable |
| Example 12 | 0.38 | 80 | Yes | 0 | No |

3) Conclusions:

The catalysts according to the invention (Examples 6, 7 and 9) improve the stability at 6 months of the compositions. Those of Examples 6 and 7 prove to have the best performances. However, it appears necessary to observe a maximum content of catalyst which is set at approximately 0.35 mmol of tin per 100 g of composition.

It should be clearly understood that the invention defined by the appended claims is not limited to the specific embodiments indicated in the above description but encompasses the alternative forms thereof which depart neither from the scope nor from the spirit of the present invention.

The invention claimed is:

1. Single-component polyorganosiloxane (POS) composition comprising at least one crosslinkable linear alkoxy polyorganopolysiloxane (POS), an inorganic filler and a crosslinking catalyst C of formula(C):

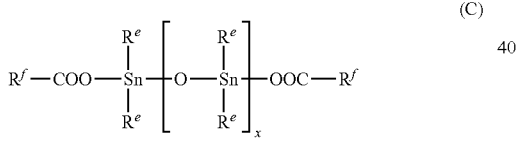

in which:
R$^e$, which are identical or different, represent a linear or branched C$_1$-C$_8$ alkyl radical,
x is 0,
R$^f$, which are identical or different, represent a saturated or unsaturated and linear or branched C$_1$-C$_{20}$ heteroalkyl radical comprising one or more O and optionally comprising one or more ester or ether functional groups,
the catalyst being present in an amount corresponding to from 0.05 to 0.35 mmol of tin per 100 g of composition,
wherein said composition is stable on storage in the absence of moisture and crosslinks in the presence of water to form an elastomer.

2. The composition according to claim 1, in which the amount of catalyst corresponds to from 0.15 to 0.32 mmol of tin per 100 g of composition.

3. The composition according to claim 1, comprising a catalyst of formula Bu$_2$Sn[OOCCH$_2$(OCH$_2$CH$_2$)$_3$OCH$_3$]$_2$.

4. The composition according to claim 1, comprising a catalyst of formula Bu$_2$Sn(OOCCH=CHCOOR)$_2$, R being an optionally branched C$_2$-C$_8$ alkyl radical.

5. The composition according to claim 4, comprising a mixture of at least two compounds of formula Bu$_2$Sn (OOCCH=CHCOOR)$_2$ comprising radicals R having different numbers of carbon atoms.

6. The composition according to claim 1, wherein the compound of formula (C) is the sole crosslinking catalyst.

7. The composition according to claim 1, in which the crosslinking is catalysed by a mixture of at least two compounds of formula (C).

8. The composition according to claim 1, wherein said at least one crosslinkable linear polyorganopolysiloxane has the formula:

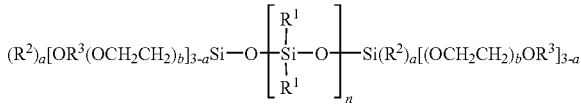

in which:
the substituents R$^1$, which are identical or different, each represent a saturated or unsaturated, substituted or unsubstituted, aliphatic, cyclanic or aromatic, C$_1$ to C$_{13}$ monovalent hydrocarbon radical;
the substituents R$^2$, which are identical or different, each represent a saturated or unsaturated, substituted or unsubstituted, aliphatic, cyclanic or aromatic, C$_1$ to C$_{13}$ monovalent hydrocarbon radical;
the substituents R$^3$, which are identical or different, each represent a linear or branched C$_1$ to C$_8$ alkyl radical or a C$_3$ to C$_8$ cycloalkyl;
n has a value sufficient to confer, on the POS A, a dynamic viscosity at 25° C. ranging from 1000 to 1 000 000 mPa·s;
a is zero or 1;
b is zero or 1;
said composition further comprising:
-B- optionally at least one polyorganosiloxane resin B functionalized by at least one alkoxy radical (OCH$_2$CH$_2$)$_b$OR$^3$, with b and R$^3$ corresponding to the definition given above, and exhibiting, in its structure, at least two different siloxyl units chosen from those of formulae (R$^1$)$_3$SiO$_{1/2}$(unit M), (R$^1$)$_2$SiO$_{2/2}$(unit D), R$^1$SiO$_{3/2}$(unit T) and SiO$_2$(unit Q), at least one of these units being a T or Q unit, the radicals R$^1$, which are identical or different, having the meanings given above with respect to the formula (A), the said resin having a content by weight of (OCH$_2$CH$_2$)$_b$OR$^3$ radicals ranging from 0.1 to 10%, it being understood that a portion of the radicals R$^1$ are(OCH$_2$CH$_2$)$_b$OR$^3$ radicals;

-D- optionally at least one crosslinking agent D of formula:

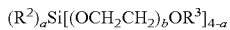

with $R^2$, $R^3$, a and b as defined above,

-E- optionally at least one unreactive and nonfunctionalized linear polydiorganosiloxane E of formula:

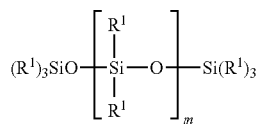

in which:
the substituents R1, which are identical or different, have the same meanings as those given above for the polyorganosiloxane A;
m has a value sufficient to confer, on the polymer of formula (E), a dynamic viscosity at 25° C. ranging from 10 to 200 000 mPa·s;

-H- an adhesion promoter.

9. The composition according to claim 8, in which the adhesion promoter is an organosilicon compound having one or more hydrolysable groups bonded to a silicon atom.

10. The composition according to claim 9, in which the adhesion promoter further comprises one or more organic groups comprising radicals selected from the group consisting of aminated, diaminated, (meth)acrylate, epoxy, alkenyl and alkyl radicals.

11. The composition according to claim 9, in which the adhesion promoter is a silane.

12. The composition according to claim 11, in which the adhesion promoter is selected from the group consisting of:
3-aminopropyltriethoxysilane,
(beta-aminoethyl)(gamma-aminopropyl)trimethoxysilane,
(beta-aminoethyl)(gamma-aminopropyl)methyldimethoxysilane,
3-aminopropyltrimethoxysilane,
vinyltrimethoxysilane,
3-glycidyloxypropyltrimethoxysilane,
3-methacryloxypropyltrimethoxysilane,
propyltrimethoxysilane,
methyltrimethoxysilane,
ethyltrimethoxysilane,
vinyltriethoxysilane,
3-aminopropylmethyldimethoxysilane,
3-aminopropylmethyldiethoxysilane,
methyltriethoxysilane,
propyltriethoxysilane,
tetraethoxysilane,
tetrapropoxysilane,
tetraisopropoxysilane,
mixtures thereof
and polyorganosiloxane oligomers comprising such organic groups at a content of greater than 20%.

13. The composition according to claim 8, in which the adhesion promoter is a silicate.

14. The composition according to claim 13, in which the adhesion promoter is an optionally polycondensed ethyl, propyl or isopropyl silicate.

15. The composition of claim 8, wherein said inorganic filler is a reinforcing filler or a bulking filler.

16. Elastomer capable of adhering to various substrates and obtained by crosslinking and curing the composition according to claim 1, containing an adhesion promoter.

17. A method for crosslinking by polycondensation an alkoxy single-component silicone elastomer composition not comprising another polycondensation catalyst, said method comprising conducting said polycondensation in the presence of at least one tin compound C of formula (C):

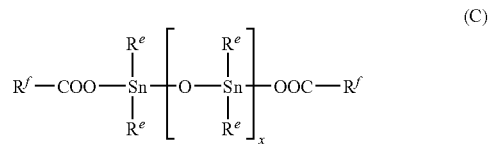

as the catalyst, in which:
$R^e$, which are identical or different, represent a linear or branched $C_1$-$C_8$ alkyl radical,
x is 0 or 1,
when x is 1, $R^f$, which are identical or different, represent a saturated or unsaturated and linear or branched $C_1$-$C_{20}$ alkyl radical comprising one or more oxygen atoms or one or more ester or ether functional groups,
when x is 0, $R^f$, which are identical or different, represent a saturated or unsaturated and linear or branched $C_1$-$C_{20}$ heteroalkyl radical comprising one or more O and optionally comprising one or more ester or ether functional groups,
the catalyst being used in an amount corresponding to from 0.05 to 0.35 mmol of tin per 100 g of the composition.

18. Single-component polyorganosiloxane (POS) composition comprising at least one crosslinkable linear alkoxy polyorganopolysiloxane (POS), an inorganic filler and a crosslinking catalyst C of formula (C):

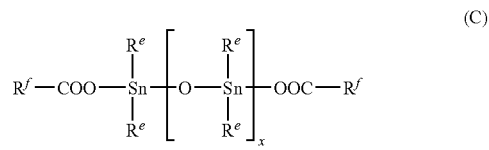

in which:
$R^e$, which are identical or different, represent a linear or branched $C_1$-$C_8$ alkyl radical,
x is 1, and
$R^f$, which are identical or different, represent a saturated or unsaturated and linear or branched $C_1$-$C_{20}$ alkyl radical comprising one or more oxygen atoms and optionally comprising one or more ester or ether functional groups,
the catalyst being present in an amount corresponding to from 0.05 to 0.35 mmol of tin per 100 g of composition,
wherein said composition is stable on storage in the absence of moisture and crosslinks in the presence of water to form an elastomer.

19. The composition according to claim 18, comprising a catalyst of formula $[Bu_2Sn(OOC\text{—}C_{11}H_{23})]_2O$.

20. The composition of claim 18, wherein $R^f$, which are identical or different, represent a saturated or unsaturated and linear or branched $C_1$-$C_{20}$ alkyl radical comprising one or more ester or ether functional groups.

* * * * *